United States Patent
Fukuzawa et al.

(10) Patent No.: US 6,613,479 B2
(45) Date of Patent: Sep. 2, 2003

(54) POSITIVE ELECTRODE MATERIAL AND BATTERY FOR NONAQUEOUS ELECTROLYTE SECONDARY BATTERY

(75) Inventors: Tatsuhiro Fukuzawa, Kanagawa (JP); Fumio Munakata, Yokohama (JP); Yasuhiko Ohsawa, Kanagawa (JP); Yuuji Tanjo, Yokohama (JP); Takuya Mihara, Kanagawa (JP); Takashi Kimura, Kanagawa (JP); Kazuo Sunahara, Kanagawa (JP); Manabu Suhara, Kanagawa (JP)

(73) Assignees: Nissan Motor Co., Ltd., Yokohama (JP); Seimi Chemical Co., Ltd., Chigasaki (JP)

( * ) Notice: Subject to any disclaimer, the term of this patent is extended or adjusted under 35 U.S.C. 154(b) by 207 days.

(21) Appl. No.: 09/791,879

(22) Filed: Feb. 26, 2001

(65) Prior Publication Data

US 2001/0024754 A1 Sep. 27, 2001

(30) Foreign Application Priority Data

Mar. 3, 2000 (JP) ........................................ 2000-058087

(51) Int. Cl.$^7$ ............................................. H01M 10/24
(52) U.S. Cl. .................................................. 429/231.95
(58) Field of Search .......................... 429/231.95, 218.1

(56) References Cited

U.S. PATENT DOCUMENTS

| 5,316,877 A | * | 5/1994 | Thackeray et al. | .......... 429/338 |
| 6,168,888 B1 | | 1/2001 | Iwata et al. | ............ 429/231.95 |
| 6,432,581 B1 | * | 8/2002 | Amatucci et al. | ........... 429/224 |

FOREIGN PATENT DOCUMENTS

| EP | 0 581 290 | 2/1994 |
| JP | 10-334918 | 12/1998 |
| JP | 2870741 | 1/1999 |
| JP | 11-45710 | 2/1999 |
| JP | 11-71115 | 3/1999 |
| JP | 11-73962 | 3/1999 |
| JP | 11-171550 | 6/1999 |

OTHER PUBLICATIONS

A. Robert Armstrong & P.G. Bruce, "Synthesis Of Layered LiMnO2 As An Electrode For Rechargeable Lithium Batteries", *Nature*, vol. 381, Issue No. 6582, pp. 499–500, Jun. 6, 1996, published by Macmillan Magazines Ltd.

Patent Abstracts of Japan, vol. 018, No. 263, May 19, 1994; Shoji Yamanaka, "Lithium Secondary Battery and Manufacture Thereof", 06044973, Feb. 18, 1994.

Dai et al., "Synthesis and Characterization of the Hollandite–type MnO2 as a Cathode Material in Lithium Batteries", Electrochimica Acta, Elsevier Science Publishers, vol. 45, No. 14, pp. 2211–2217, Mar. 2000.

Johnson et al., "Structural and Electrochemical Studeis of α–Manganese Dioxide (α–MnO$_2$)", Journal of Power Sources, Elsevier, vol. 68, No. 2, pp. 570–577, Oct. 1, 1997.

\* cited by examiner

*Primary Examiner*—Randy Gulakowski
*Assistant Examiner*—Monique Wills
(74) *Attorney, Agent, or Firm*—Foley & Lardner

(57) ABSTRACT

A positive electrode active material for a nonaqueous electrolyte secondary battery includes at least a lithium-containing manganese layered composite oxide represented by the general formula Li1-xMO2-y-δFy. The second metallic element or constituent M may be Mn or a combination of Mn and substitute metal such as Co, Ni, Cr, Fe, Al, Ga or In. A lithium deficiency quantity x is in the range of 0<x<1. An oxygen defect quantity δ may be equal to or smaller than 0.2. A quantity y of fluorine substituting for part of oxygen is greater than zero.

18 Claims, 1 Drawing Sheet

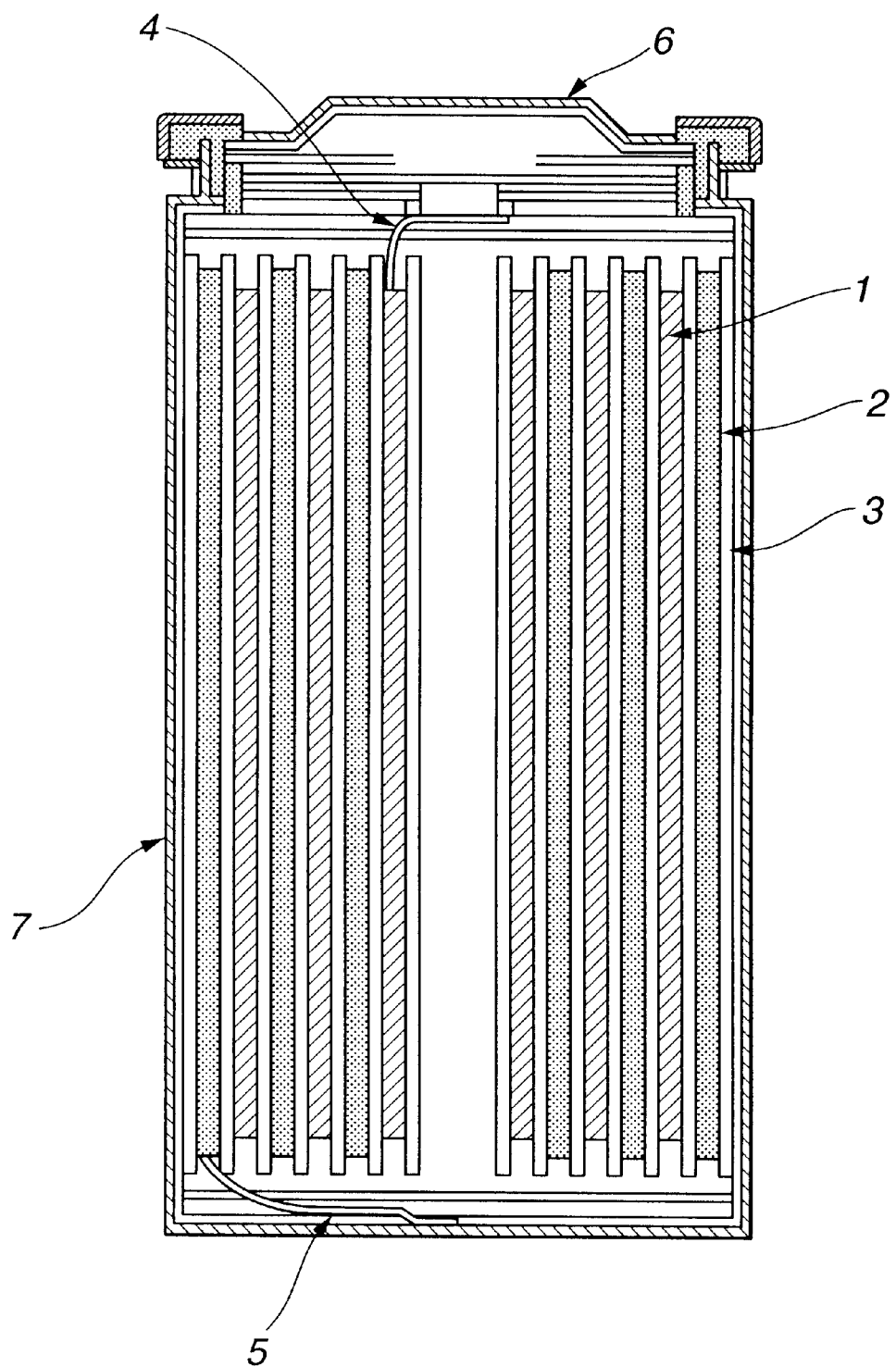

POSITIVE ELECTRODE MATERIAL AND BATTERY FOR NONAQUEOUS ELECTROLYTE SECONDARY BATTERY

BACKGROUND OF THE INVENTION

The present invention relates to positive electrode active material and lithium secondary batteries. More specifically, the present invention relates to lithium containing manganese layered oxide suitable as positive electrode active material for nonaqueous electrolyte secondary batteries and nonaqueous electrolyte secondary batteries using, as positive electrode active material, the lithium containing manganese layered oxide which is higher in capacity than conventional lithium manganese composite oxide having a spinel structure, and advantageous in cycle durability at high temperatures than conventional lithium manganese composite oxide having a layered structure.

Among various rechargeable secondary batteries, the lithium secondary battery with its high charge-discharge voltage and large charge-discharge capacity has shown much promise as source of electricity for electric vehicles to meet the recent intense demand for zero-emission vehicles in environmental problem.

In consideration of some aspects of $LiCoO_2$ such as the stability in working environment, cost and natural reserves of $LiCoO_2$ used as positive electrode active material for a lithium secondary battery, investigation is currently under way on spinel structure lithium manganese composite oxide ($LiMn_2O_4$) as positive electrode active material of a secondary battery for an automotive vehicle. However, $LiMn_2O_4$ is deficient in durability at high temperatures and liable to cause deterioration in performance of the negative electrode due to dissolution of the positive electrode material into the electrolyte. In view of this, Japanese Published Patent Applications, Publication (Kokai) Nos. 11(1999)-171550 and 11(1999)-73962 propose technique of substituting transition metal element or typical metal element for part of Mn.

SUMMARY OF THE INVENTION

However, the substitution of various elements for part of Mn to improve the high temperature cycle durability as disclosed in Published Japanese Patent Application, Publication (Kokai) No. 11(1999)-71115 is liable to cause distortion in the crystal structure and hence deteriorate the cycle durability at room temperature. Published Japanese Patent Applications, Publication (Kokai) Nos. 10(1998)-334918 and 11(1999)-45710 propose the substitution of halogen such as fluorine for part of oxygen to improve the cycle durability. However, an increase in the amount of substitution for further improvement of the cycle durability tends to lower the capacity of the active material.

As to the capacity, lithium cobalt oxides ($LiCoO_2$: the active material capacity=140 mAh/g) are higher in capacity than spinel type lithium manganese composite oxides ($LiMn_2O_4$: the active material capacity=100 mAh/g). However, lithium cobalt oxides are disadvantageous in the stability etc., as mentioned before. Therefore, a desired positive electrode active material is a high-capacity Mn containing lithium composite oxide which is higher in the Li content in the crystal structure than the spinel lithium manganese composite oxides ($LiMn_2O_4$) and which is superior in stability in operating environment to the lithium cobalt oxides ($LiCoO_2$: active material capacity=140 mAh/g).

In such a high-capacity type positive electrode active material for a lithium secondary battery, the lithium content in a chemical formula based on the crystal structure is determinative. Japanese Patent 2870741 seeks for a high-capacity Mn containing lithium composite oxide on the basis of crystal-chemical studies.

A recent report (A. Robert Armstrong & P. G. Bruce "Synthesis of layered $LiMnO_2$ as an electrode for rechargeable lithium batteries", Nature, vol.381 (1996) p499) reveals $LiMnO_2$ layered oxide has a positive electrode active material capacity of about 270 mAh/g, more than twice of that of a conventional spinel structure lithium manganese oxide.

With this layered oxide, a sufficient charge-discharge characteristic is obtainable at 55° C., for example. However, the active material capacity decreases to about one third at room temperature. Moreover, the capacity is decreased gradually by repetition of charge and discharge at temperatures over room temperature, so that the cycle durability is insufficient.

It is therefore an object of the present invention to provide a lithium manganese layered composite oxide positive electrode active material which is higher in capacity than the conventional spinel structure lithium manganese composite oxide, and advantageous in high temperature cycle durability to the conventional layered structure lithium manganese composite oxide, and to provide a high-performance lithium secondary battery using this high-capacity lithium manganese layered composite oxide.

According to the present invention, a positive electrode active material for a nonaqueous electrolyte secondary battery comprises: a lithium-containing manganese layered composite oxide represented by the general formula $Li_{1-x}MO_2$-y-$\delta F_y$ where x is a lithium deficiency quantity representing a quantity of deficiency in lithium with respect to a composite oxide represented by the general formula $LiMO_2$, y is a fluorine substitution quantity representing a quantity of fluorine substituting for part of oxygen, $\delta$ is an oxygen defect quantity, and M is a metallic constituent comprising Mn.

BRIEF DESCRIPTION OF THE DRAWINGS

FIGURE is a view showing a nonaqueous secondary battery according to one embodiment of the present invention.

DETAILED DESCRIPTION OF THE INVENTION

In conventional spinel structure lithium manganese composite oxides and layered structure lithium manganese composite oxides, considerable crystal lattice distortion is involved due to Jahn-Teller ions of $Mn^{+3}$ the valence of Mn varies from +3 to +4 by charge and discharge operations of Li, the volume of the crystal lattice changes repeatedly, and hence the characteristic degrades to less durability. One possible way for increasing the stability of the crystal structure is to introduce an element capable of serving as support for the crystal lattice and thereby to prevent distortion in the crystal lattice during intercalation and deintercalation of lithium. From such a viewpoint, strong endeavor has been made by the inventors of this application to seek a new composite oxide.

Attention has been paid to the conventional NaCl type MO crystal and the layered structure $LiMO_2$ composite oxide which are thought to be very similar in structure, and the inventors of this application has conceived that the layered structure LiMO2 composite oxide is repetition of MO crystal block. The view reached from this notion is that the layered LiMO2 composite oxide has a structure of regular repetition of [LiO][MO] block in which the MO blocks [MO] and LiO blocks [LiO] are arranged alternately.

By applying this view of the block structure, the crystal structure of known sodium manganese oxide Na2/3MnO2 is expressed as [Na2/3O][MnO]. This oxide is considered to have a structure formed by regularly making the Na occupancy in the [NaO] block deficient in the [NaO][MO] block structure. This suggests the possibility of creating a new layered structure lithium manganese oxide. Moreover, it is possible to increase the stability of the lattice by partial substitution of fluorine for oxygen in a layered structure of earlier technology.

Such contemplation has been applied to the [LiO][MO] block structure, and the notion reached by the inventors of this application is that it is possible to create new layered lithium manganese composite oxide having superior durability by regularly making deficient the Li occupancy in [LiO] block, and substituting fluorine for part of oxygen.

Furthermore, the guide for the material design reached by the inventors is that the crystal-chemical difference between Li site and Mn site is small by nature, and by selecting the amount of element substitution properly, it is possible to stabilize the distortion in the crystal and the chemical bond, to improve the cycle stability during charge and discharge and the durability, to restrain reaction with the electrolyte, and thereby to obtain manganese layered composite oxide positive electrode active material having a superior cycle stability.

According to this guide of the regular element substitution, to hold the high temperature cycle stability and durability, the inventors have found novel high-capacity Mn-containing lithium composite oxide positive electrode active materials superior in cycle stability to the conventional layered structure lithium manganese composite oxide by setting the substitution quantity y of regular substitution at Mn site equal to ½, ⅓, ⅔, ¼, ⅕, ⅖, ⅙, . . . , ⅛, . . . .

A positive electrode active material for a nonaqueous electrolyte secondary battery according to the present invention includes at least a lithium-containing manganese layered composite oxide. The lithium-containing manganese layered composite oxide is deficient in lithium by a lithium deficiency quantity x. The lithium-containing manganese layered composite oxide includes at least a second metallic constitute M and fluorine (F) substituted for a part of oxygen. This lithium-containing manganese layered composite oxide is represented by the general formula Li1-xMO2-y-δFy.

A nonaqueous secondary battery according to the present invention includes at least a negative electrode and a positive electrode including at least such a lithium-containing manganese layered composite oxide. Preferably, the negative electrode includes at least a negative electrode active material capable of retaining and releasing lithium ions, and the positive electrode includes at least a positive electrode active material capable of retaining and releasing lithium ions. An electrolyte may be a lithium ion conductive nonaqueous liquid electrolyte.

In the general formula Li1-xMO2-y-δFy (which may be Li1-xMnO2-y-δFy or Li1-xMn1-zMezO2-y-δFy), the lithium deficiency quantity x is equal to a rational number in the range greater than zero and smaller than one (0<x<1). The lithium deficiency quantity x represents an amount of deficient Li deficient as compared to the stoichiometric composition in the lithium-containing manganese layered composite oxide. It is not desirable to decrease the lithium deficiency quantity x too much because of resulting adverse influence on the cycle stability. On the other hand, an excessive increase of the lithium deficiency quantity x incurs an undesired decrease in the active material capacity.

The oxygen defect quantity δ represents an amount of oxygen defect. Preferably, the oxygen defect quantity δ is equal to or smaller than 0.2 (δ≦0.2). When the oxygen defect quantity δ is greater than 0.2, the crystal structure becomes unstable, and the cycle performance becomes poor.

Preferably, the lithium deficiency quantity x is equal to a ratio (or quotient) a/b (x=a/b). The numerator a is smaller than the denominator b (a<b). Each of the numerator a and the denominator b is a positive integer which is equal to or greater than one and which is equal to or smaller than 30 (1≦a≦30, 1≦b≦30). A composition variation of x is in the range of ±5%. The cycle durability becomes insufficient if the integer a and/or the integer b is smaller than one. The cycle durability becomes insufficient if the integer a and/or the integer b is greater than 30. The crystal structure becomes unstable and the cycle performance becomes poor if the inequality a<b is not satisfied. The cycle durability becomes insufficient if the variation of x is greater than ±5% of if the variation of x is smaller than −5%.

Preferably, a substitution quantity y of F is equal to or greater than 0.03, and equal to or smaller than 0.25 (0.03≦y≦0.25). The effect of the substitution is insufficient if the substitution quantity y is smaller than 0.03. If y is greater than 0.25, the crystal structure becomes unstable and the cycle performance becomes poor.

When the second metallic constituent M is Mn, the lithium-containing manganese layered composite oxide is represented by the general formula Li1-xMnO2-y-δFy.

When the second metallic constituent M includes at least Mn and a substitute metal Me substituting for a part of Mn, the lithium-containing manganese layered composite oxide is represented by the general formula Li1-xMn1-zMezO2-y-δFy.

The substitute metal Me is not Mn and the substitute metal Me may be a transition metal or a typical metallic element. Specifically, the substitute metal Me may be any one or more of Co, Ni, Cr, Fe, Al, Ga and In.

Preferably, the substitution quantity z of the substitute metallic element Me for Mn is equal to or greater than 0.03, and equal to or smaller than 0.5. The durability becomes insufficient if z is smaller than 0.03. The capacity of the active material becomes insufficient if z is greater than 0.5.

As a production process for producing the lithium manganese composite oxide according to the present invention, it is possible to employ a process including at least a mixing step of mixing manganese compound, lithium compound, fluorine compound and compound of the substitute metal (if the substitute metal is employed) homogeneously at a predetermined molar ratio, and a calcining step of calcining the mixture in the atmosphere of low oxygen concentration.

Examples of the manganese compound which can be used in this process are; electrolytic manganese dioxide, chemically synthesized manganese dioxide, dimanganese trioxide, γ-MnOOH, manganese carbonate, manganese nitrate, manganese acetate. A desirable range of the average particle diameter of the manganese compound powder is 0.1~100 μm. Preferably, the average particle diameter is equal to or smaller than 20 μm. If the grain size is too large, the reaction between the manganese compound and the lithium compound becomes very slow, and the homogeneity of the product material becomes lower.

Examples of the lithium compound are; lithium carbonate, lithium hydroxide, lithium nitrate, lithium oxide, and lithium acetate. Preferable examples are lithium carbonate and lithium hydroxide. Preferably, the average particle diameter is equal to or smaller than 30 μm.

Examples of the fluorine compound are; manganese fluoride and lithium fluoride. Lithium fluoride is preferable. Desirably, the average particle diameter is equal to or smaller than 30 μm. More desirably, the average particle diameter is equal to or smaller than 10 μm.

Examples of the process for preparing precursors for the production of the lithium manganese composite oxide according to the present invention are; dry or wet blending of manganese compound, lithium compound and fluorine compound; dry or wet blending of fluorine-containing manganese compound synthesized from manganese compound and fluorine compound, and lithium compound; and dry or wet blending of LiMnO2 and fluorine compound.

The calcination is carried out in an atmosphere of low oxygen concentration. A preferable atmosphere for the calcination is an oxygen-free atmosphere of gas such as nitrogen, argon or carbon dioxide. Desirably, the oxygen concentration in the atmosphere is equal to or lower than 1000 ppm. More desirably, the oxygen concentration is equal to or lower than 100 ppm.

A desirable calcination temperature is equal to or lower than 1100° C. More desirably, the calcination temperature is equal to or lower than 950° C. Temperatures above 1100° C. tend to incur decomposition of the product material. Desirably, the calcination time is in the range of 1~48 hours. More desirably, the calcination time is in the range of 5~24 hours. The calcination may be a single stage calcination or a multi-stage calcination consisting of two or more calcination steps of different calcination temperatures.

It is possible to efficiently lower the oxygen concentration in the calcination atmosphere by addition to precursor or precursors for producing the lithium manganese oxide according to the present invention, of carbon containing compound, preferably carbon powder such as carbon black or acetylene black, or organic substance such as citric acid. The amount of the addition is in the range of 0.05~10%. When the amount of the addition is on the smaller side of this range, the effect is too low. When the amount of the addition is on the greater side, the possibility of byproduct becomes high, and the purity of the target product becomes low because of residue of the additive carbon containing compound.

In the nonaqueous electrolyte secondary battery according to the present invention, it is possible to use, as the material of the negative electrode, any of negative electrode materials for nonaqueous secondary batteries. Examples are; metallic lithium, lithium alloy, metallic oxide such as SnSiO3, metallic nitride such as LiCoN2 and carbon material. Examples of the carbon material are; coke, natural graphite, artificial graphite, and non-graphitizable carbon.

As the electrolytic solution or liquid electrolyte, it is possible to use lithium salt, as electrolyte, dissolved in nonaqueous solvent. Examples of the electrolyte are; LiClO4, LiAsF6, LiPF6, LiBF4, LiCF3SO3 and Li(CF3SO2)2N.

As organic solvent, carbonates, lactones, ethers and others are candidates. Examples are; ethylene carbonate, propylene carbonate, diethyl carbonate, dimethyl carbonate, methyl ethyl carbonate, 1,2-dimethoxy ethane, 1,2-diethoxy ethane, tetrahydrofuran, 1,3-dioxolan, and γ-butyrolactone. It is possible to use any one or more of these solvents singly or in combination. The concentration of the electrolyte dissolved in the solvent can be 0.5~2.0 mole/liter.

Besides these examples, it is possible to use solid or viscous liquid of one or more of the above mentioned electrolytes dispersed homogeneously in high polymer matrix. This solid or viscous liquid may be further impregnated with nonaqueous solvent. As the high polymer matrix, it is possible to employ polyethylene oxide, polypropylene oxide, polyacrylonitrile or polyvinylidene fluoride.

It is possible to provide a separator for preventing short-circuit between the positive and negative electrodes. Examples of the separator are; porous sheet and nonwoven fabric-of polyethylene, polypropylene, or cellulose.

PRACTICAL EXAMPLES

In the following practical examples and comparative example, positive and negative electrodes were prepared in the following manner, and encapsulated type nonaqueous solvent battery cells were produced. These practical examples are not exhaustive listings, and the present invention is not limited to these practical examples.

Production of Positive Electrode

Lithium hydroxide monohydrate powder, dimanganese trioxide powder, lithium fluoride and substitute element compound for the Mn site were weighed at a predetermined mole ratio, and mixed in a mortar. Thereafter, the mixture was subjected to heat treatment at 950° C. for 24 hours in an atmosphere of argon. After cooling, the calcined product was ground in a mortar. In this way, positive electrode materials having mole ratios of lithium, manganese and fluorine as listed in Table 1 were obtained.

Production of Cell

Each of the obtained positive electrode materials was mixed with acetylene black as conducting material and PTFE powder as binding material at a weight ratio of 80:16:4. The mixture was molded into a circular disc having a diameter of 12 mm by a pressure of 2 t/cm 2. The molded mixture was subjected to heat treatment at 150° C. for 16 hours to produce a positive electrode disc. Then, a negative electrode member was formed by compressing lithium metal in the shape of a circular disc having a diameter of 12 mm and mesh-shaped negative electrode collector plate of stainless steel.

As the electrolyte, use was made of a solution of a combined solvent obtained by mixing ethylene carbonate and diethyl carbonate at a volume ratio of 1:1, and LiPF6 dissolved in the combined solvent at a concentration of 1 mole/liter. Polypropylene film was used as a separator.

SUS sheet was used as a collector of the positive electrode. Leads were taken out, respectively, from the positive and negative electrodes, and an element was formed by placing the positive and negative electrode members so as to confront each other across the separator. While being pressed by a spring, this element was interposed between two PTFE plates. Furthermore, the sides of the element were covered by PTFE plates, and a sealed nonaqueous battery cell was completed. The production of the cell was carried out in the atmosphere of argon.

Evaluation

The thus-produced nonaqueous battery cells were examined to evaluate the charge-discharge cycle performance by repetition of charge-discharge cycle at a temperature of 60°

C., at a constant current of 0.5 mA/cm² in a voltage range from 4.3V to 2.0V. Table 1 shows the number of charge-discharge cycles reached when the discharge capacity decreases below 90% of the initial discharge capacity.

In the following, each of the practical examples are expressed in terms of the block structure [Li1-xO][Mn1-zMezO1-yFy] according to the before-mentioned guiding principle of the present invention.

Practical Example 1

Li0.67MnO1.95(-δ)F0.05 in a row of Table 1 for a first practical example is expressed, in the form of block structure representation taking no account of the oxygen defect (oxygen nonstoichiometry δ), as [Li2/3O][MnO1.95F0.05]. In the first practical example, $x=1/3$, $z=0$ and $y=0.05$ in the general block structure formula [Li1-xO][Mn1-zMezO1-yFz].

Practical Example 2

Similarly, Li0.83MnO1.95(-δ)F0.05 in the row of Table 1 for a second practical example is expressed, in the form of the block structure representation taking no account of the oxygen defect (oxygen nonstoichiometry δ), as [Li5/6O][MnO1.95F0.05]. In the second practical example, $x=1/6$, $z=0$ and $y=0.05$ in the general block structure formula [Li1-xO][Mn1-zMezO1-yFz].

Practical Example 3

Li0.967MnO1.95(-δ)F0.05 in the row of Table 1 for a third practical example is expressed, in the form of block structure representation taking no account of the oxygen defect (oxygen nonstoichiometry δ), as [Li29/30O][MnO1.95F0.05]. In the third practical example, $x=1/30$, $z=0$ and $y=0.05$ in the general block structure formula [Li1-xO][Mn1-zMezO1-yFz].

Practical Example 4

Li0.967MnO1.90(-δ)F0.10 in the row of Table 1 for a fourth practical example is expressed, in the form of block structure representation taking no account of the oxygen defect (oxygen nonstoichiometry δ), as [Li29/30O][MnO1.90F0.10]. In the fourth practical example, $x=1/30$, $z=0$ and $y=0.10$ in the general block structure formula [Li1-xO][Mn1-zMezO1-yFz].

Practical Example 5

Li0.967MnO1.75(-δ)F0.25 in the row of Table 1 for a fifth practical example is expressed, in the form of block structure representation taking no account of the oxygen defect (oxygen nonstoichiometry δ), as [Li29/30O][MnO1.75F0.25]. In the fifth practical example, $x=1/30$, $z=0$ and $y=0.250$ in the general block structure formula [Li1-xO][Mn1-zMezO1-yFz].

Practical Example 6

Li0.83Mn0.75Co0.25O1.95(-δ)F0.05 in the row of Table 1 for a sixth practical example is expressed, in the form of block structure representation taking no account of the oxygen defect (oxygen nonstoichiometry δ), as [Li5/6O][Mn3/4Co1/4O1.95F0.05]. In the sixth practical example, $x=1/6$, $z=1/4$, Me=Co, and $y=0.05$ in the general block structure formula [Li1-xO][Mn1-zMezO1-yFz].

Practical Example 7

Li0.83Mn0.75Ni0.25O1.95(-δ)F0.05 in the row of Table 1 for a seventh practical example is expressed, in the form of block structure representation taking no account of the oxygen defect (oxygen nonstoichiometry δ), as [Li5/6O][Mn3/4Ni1/4O1.95F0.05]. In the seventh practical example, $x=1/6$, $z=1/4$, Me=Ni, and $y=0.05$ in the general block structure formula [Li1-xO][Mn1-zMezO1-yFz].

Practical Example 8

Li0.83Mn0.75Fe0.25O1.95(-δ)F0.05 in the row of Table 1 for an eighth practical example is expressed, in the form of block structure representation taking no account of the oxygen defect (oxygen nonstoichiometry δ), as [Li5/6O][Mn3/4Fe1/4O1.95F0.05]. In the eighth practical example, $x=1/6$, $z=1/4$, Me=Fe, and $y=0.05$ in the general block structure formula [Li1-xO][Mn1-zMezO1-yFz].

Practical Example 9

Li0.83Mn0.75Al0.25O1.95(-δ)F0.05 in the row of Table 1 for a ninth practical example is expressed, in the form of block structure representation taking no account of the oxygen defect (oxygen nonstoichiometry δ), as [Li5/6O][Mn3/4Al1/4O1.95F0.05]. In the ninth practical example, $x=1/6$, $z=1/4$, Me=Al, and $y=0.05$ in the general block structure expression [Li1-xO][Mn1-zMezO1-yFz].

Practical Example 10

Li0.83Mn0.75Cr0.25O1.95(-δ)F0.05 in the row of Table 1 for a tenth practical example is expressed, in the form of block structure representation taking no account of the oxygen defect (oxygen nonstoichiometry δ), as [Li5/6O][Mn3/4Cr1/4O1.95F0.05]. In this practical example, $x=1/6$, $z=1/4$, Me=Cr, and $y=0.05$ in the general block structure formula [Li1-xO][Mn1-zMezO1-yFz].

Practical Example 11

Li0.83Mn0.75Ga0.25O1.95(-δ)F0.05 in the row of Table 1 for an eleventh practical example is expressed, in the form of block structure representation taking no account of the oxygen defect (oxygen nonstoichiometry δ), as [Li5/6O][Mn3/4Ga1/4O1.95F0.05]. In the eleventh practical example, $x=1/6$, $z=1/4$, Me=Ga, and $y=0.05$ in the general block structure formula [Li1-xO][Mn1-zMezO1-yFz].

Practical Example 12

Li0.83Mn0.75In0.25O1.95(-δ)F0.05 in the row of Table 1 for a twelfth practical example is expressed, in the form of block structure representation taking no account of the oxygen defect (oxygen nonstoichiometry δ), as [Li5/6O][Mn3/4In1/4O1.95F0.05]. In the twelfth practical example, $x=1/6$, $z=1/4$, Me=In, and $y=0.05$ in the general block structure formula [Li1-xO][Mn1-zMezO1-yFz].

Comparative Example

Li1.0Mn1.0O2(-δ) in the row of Table 1 for a comparative example is expressed, in the form of block structure representation taking no account of the oxygen defect (oxygen nonstoichiometry δ), as [LiO][MnO]. In this comparative example, $x=0$, and $y=0$ in the general block structure formula [Li1-xAxO][Mn1-yMyO].

TABLE 1

| Samples | Composition of Positive Electrode Material | $\delta$ | Number of Cycles |
|---|---|---|---|
| Practical Example 1 | Li0.67MnO1.95F0.05 | 0.13 | 128 |
| Practical Example 2 | Li0.83MnO1.95F0.05 | 0.05 | 135 |
| Practical Example 3 | Li0.967MnO1.95F0.05 | 0.01 | 108 |
| Practical Example 4 | Li0.967MnO1.90F0.10 | 0.01 | 107 |
| Practical Example 5 | Li0.967MnO1.75F0.25 | 0.01 | 111 |
| Practical Example 6 | Li0.83Mn0.75Co0.25O1.95F0.05 | 0.06 | 158 |
| Practical Example 7 | Li0.83Mn0.75Ni0.25O1.95F0.05 | 0.03 | 146 |
| Practical Example 8 | Li0.83Mn0.75Fe0.25O1.95F0.05 | 0.03 | 101 |
| Practical Example 9 | Li0.83Mn0.75Al0.25O1.95F0.05 | 0.05 | 139 |
| Practical Example 10 | Li0.83Mn0.75Cr0.25O1.95F0.05 | 0.07 | 151 |
| Practical Example 11 | Li0.83Mn0.75Ga0.25O1.95F0.05 | 0.06 | 83 |
| Practical Example 12 | Li0.83Mn0.75In0.25O1.95F0.05 | 0.05 | 72 |
| Comparative Example | LiMnO2 | 0 | 10 |

The lithium secondary battery cell of each of the first through twelfth practical examples employs, as positive electrode material, a lithium-containing manganese composite oxide represented by the general formula $Li_{1-x}Mn_{1-z}Me_zO_{2-y-\delta}F_y$. The lithium manganese layered composite oxide positive electrode active material of such a type is higher in capacity than the conventional spinel structure lithium manganese composite oxide, and advantageous in high temperature cycle durability to the conventional layered structure lithium manganese composite oxide. Moreover, sufficient cycle stability can be achieved without decreasing the active material capacity in these practical examples. In these practical examples, the lithium deficiency quantity x is a rational number a/b where each of the numerator a and the denominator b is an integer equal to or greater than 1 and equal to or smaller than 30, and a<b. The oxygen defect quantity $\delta$ is equal to or smaller than 0.2 ($67 \leq 0.2$). The fluorine substitution quantity y is equal to or greater than 0.03 and equal to or smaller than 0.25 ($0.03 \leq y \leq 0.25$). The metal substitution quantity z is equal to 0, or in the range of $0.03 \leq z \leq 0.5$. As shown in Table 1, the lithium secondary battery cells of the first through twelfth practical examples are significantly improved in cycle performance as compared to the lithium battery cell of the comparative example. The lithium secondary battery cells of these practical examples are especially suitable for batteries for EV and HEV because of the compactness and prolonged lifetime.

FIGURE shows a nonaqueous electrolyte secondary battery employing the positive electrode active material in one of the first through twelfth practical example. The nonaqueous electrolyte secondary battery includes a positive electrode 1, a negative electrode 2, a separator 3, a positive electrode lead 4, a negative electrode lead 5, a cover 6 on the positive electrode's side, and a battery casing 7.

This application is based on a basic Japanese Patent Application No. 2000-058087. The entire contents of the basic Japanese Patent Application No. 2000-058087 with a filing date of Mar. 3, 2000 in Japan are hereby incorporated by reference.

Although the invention has been described above by reference to certain embodiments and practical examples of the invention, the invention is not limited to the embodiments and practical examples described above. Modifications and variations of the embodiments and practical examples described above will occur to those skilled in the art in light of the above teachings. The scope of the invention is defined with reference to the following claims.

What is claimed is:

1. A positive electrode active material for a nonaqueous electrolyte secondary battery, the positive electrode active material comprising:
   a lithium-containing manganese layered composite oxide represented by the general formula $Li_{1-x}MO_{2-y-\delta}F_y$ where x is a lithium deficiency quantity representing a quantity of deficiency in lithium with respect to a composite oxide represented by the general formula $LiMO_2$, y is a fluorine substitution quantity representing a quantity of fluorine substituting for part of oxygen, $\delta$ is an oxygen defect quantity, and M is a metallic constituent comprising Mn.

2. The positive electrode active material as claimed in claim 1, wherein the lithium deficiency quantity x is a rational number in the range of $0 \leq x \leq 1$, and the oxygen defect quantity $\delta$ is in the range of $\delta \leq 0.2$.

3. The positive electrode active material as claimed in claim 2, wherein the lithium deficiency quantity x is equal to a ratio a/b of a first integer a selected from natural numbers from 1 to 30, to a second integer b which is selected from the natural numbers from 1 to 30 and which is greater than the first integer a.

4. The positive electrode active material as claimed in claim 3, wherein the fluorine substitution quantity y is in the range of $0.03 \leq y \leq 0.25$.

5. The positive electrode active material as claimed in claim 3, wherein a variation width of the lithium deficiency quantity x is within the range of ±5%.

6. The positive electrode active material as claimed in claim 1, wherein the metallic constituent M is Mn, and the lithium-containing manganese layered composite oxide is represented by the general formula $Li_{1-x}MnO_{2-y-\delta}F_y$.

7. The positive electrode active material as claimed in claim 1, wherein the metallic constituent M comprises Mn and a substitute metal Me substituting for a part of Mn, and the lithium-containing manganese layered composite oxide is represented by the general formula $Li_{1-x}Mn_{1-z}Me_zO_{2-y-\delta}F_y$.

8. The positive electrode active material as claimed in claim 7, wherein the substitute metal Me is not Mn and the substitute metal Me comprises at least one metal selected from the group consisting of transition metals and typical metallic elements.

9. The positive electrode active material as claimed in claim 8, wherein the substitute metal Me comprises at least one selected from the group consisting of Co, Ni, Cr, Fe, Al, Ga and In.

10. The positive electrode active material as claimed in claim 9, wherein a metal substitution quantity z of the substitute metal Me for Mn is in the range of $0.03 \leq z \leq 0.5$.

11. The positive electrode active material as claimed in claim 9, wherein the substitution quantity z of the substitute metal Me for Mn is a rational number in the range of $0.03 \leq z \leq 0.5$.

12. A nonaqueous electrolyte secondary battery comprising:
   a negative electrode; and
   a positive electrode comprising a positive electrode active material which comprises a lithium-containing manganese layered composite oxide which is deficient in lithium as compared to a composite oxide represented by the general formula $LiMO_2$, which comprises fluorine substituting for part of oxygen, and which is represented by the general formula $Li_{1-x}MO_{2-y-\delta}F_y$ where M is a metallic constituent comprising Mn.

13. The nonaqueous electrolyte secondary battery as claimed in claim 12, wherein the negative electrode comprises at least one selected from the group consisting of Li metal, composite oxide, nitride and carbon.

14. The nonaqueous secondary battery as claimed in claim 12, wherein an oxygen defect quantity $\delta$ in the lithium-containing manganese layered composite oxide represented by the general formula $Li_{1-x}MO_{2-y-\delta}F_y$ is in the range of $\delta \leq 0.2$; wherein a lithium deficiency quantity x in the lithium-containing manganese layered composite oxide represented by the general formula $Li_{1-x}MO_{2-y-\delta}F_y$ is equal to a ratio a/b of a first integer a selected from natural numbers from 1 to 30, to a second integer b which is selected from the natural numbers from 1 to 30 and which is greater than the first integer a; wherein a composition variation of the lithium deficiency quantity x is in the range of ±5%; and wherein a fluorine substitution quantity y is in the range of $0.03 \leq y \leq 0.25$.

15. The nonaqueous secondary battery as claimed in claim 14, wherein the metallic constituent M is Mn, and the lithium-containing manganese layered composite oxide is represented by the general formula $Li_{1-x}MnO_{2-y-\delta}F_y$.

16. The nonaqueous secondary battery as claimed in claim 14, wherein the metallic constituent M comprises Mn and a substitute metal Me substituting for part of Mn, and the lithium-containing manganese layered composite oxide is represented by the general formula $Li_{1-x}Mn_{1-z}Me_zO_{2-y-\delta}F_y$; wherein the substitute metal Me is not Mn and the substitute metal Me is at least one metal selected from the group consisting of transition metals and typical metallic elements; wherein the substitute metal Me is at least one metal selected from the group consisting of Co, Ni, Cr, Fe, Al, Ga and In; and wherein a substitution quantity z of the substitute metal Me for Mn is in the range of $0.03 \leq z \leq 0.5$.

17. The positive electrode active material as claimed in claim 1, wherein the metallic constituent M comprises Mn as a main component; and the lithium-containing manganese layered composite oxide is a compound formed so that the lithium-containing manganese layered composite oxide is deficient in lithium with respect to a stoichiometric composition in the general formula $LiMO_2$.

18. The nonaqueous electrolyte secondary battery electrode active material as claimed in claim 12, wherein the metallic constituent M comprises Mn as a main component; and the lithium-containing manganese layered composite oxide is a compound formed so that the lithium-containing manganese layered composite oxide is deficient in lithium with respect to a stoichiometric composition in the general formula $LiMO_2$.

* * * * *